United States Patent [19]

Hubbard

[11] Patent Number: 4,717,099

[45] Date of Patent: Jan. 5, 1988

[54] FIRE SPRINKLER ALIGNMENT BRACKET

[76] Inventor: George R. Hubbard, 13342 Caminito Carmel, Del Mar, Calif. 92014

[21] Appl. No.: 863,367

[22] Filed: May 15, 1986

[51] Int. Cl.[4] .......... F16C 5/00

[52] U.S. Cl. .......... 248/57; 248/75; 248/70; 248/71; 248/72; 248/74.1; 248/228; 248/546

[58] Field of Search .......... 248/57, 56, 58, 67, 248/65, 67.7, 68.1, 72, 74.1, 74.4, 75, 342–345, 317, 230, 228, 231.6, 214, DIG. 6, 316.6, 70, 71, 546

[56] References Cited

U.S. PATENT DOCUMENTS

| | | | |
|---|---|---|---|
| 833,613 | 10/1906 | Maiser | 248/57 |
| 1,156,885 | 10/1915 | Caine . | |
| 1,631,355 | 6/1927 | Baldwin | 248/316.6 |
| 1,670,429 | 5/1928 | Arndt | 248/231.6 |
| 2,316,166 | 9/1940 | Huguelet | 138/75 |
| 2,846,169 | 8/1950 | Sullivan | 248/62 |
| 2,917,263 | 12/1959 | Appleton | 248/216 |
| 2,921,766 | 1/1960 | Bauer | 248/231.6 |
| 2,945,661 | 7/1960 | Appleton | 248/205 |
| 2,962,252 | 11/1960 | Frank | 248/226 |
| 2,963,253 | 12/1960 | Maier et al. | 248/298 |
| 3,066,905 | 12/1962 | Cook et al. | 248/342 |
| 3,104,087 | 9/1963 | Budnick et al. | 248/343 |
| 3,162,413 | 12/1964 | Hexdall | 248/71 |
| 3,214,126 | 10/1965 | Roos | 248/318 |
| 3,292,888 | 12/1966 | Fischer | 248/72 |
| 3,425,655 | 2/1969 | Cogdill | 248/343 |
| 3,518,421 | 6/1970 | Cogdill | 248/57 |
| 3,597,889 | 8/1971 | LoNigro | 52/28 |
| 3,797,790 | 3/1974 | Iseki | 248/230 |
| 3,944,175 | 3/1976 | Keorney | 248/62 |
| 4,041,657 | 8/1977 | Schuplin | 52/39 |
| 4,149,693 | 4/1973 | LoNigro | 248/342 |
| 4,356,986 | 11/1982 | Lynch | 248/57 |
| 4,406,216 | 9/1983 | Hott et al. | 98/116 |
| 4,518,141 | 5/1985 | Parkin | 248/57 |
| 4,550,451 | 11/1985 | Hubbard | 4/192 |

FOREIGN PATENT DOCUMENTS

| | | | |
|---|---|---|---|
| 570140 | 12/1975 | Switzerland | 248/214 |

*Primary Examiner*—Reinaldo P. Machado
*Assistant Examiner*—Alvin Chin-Shue
*Attorney, Agent, or Firm*—Brown, Martin, Haller & Meador

[57] ABSTRACT

An alignment bracket assembly for holding and aligning a fire sprinkler supply pipe in a horizontal or vertical orientation relative to a pair of spaced apart building members such as joists, studs or T-bar suspended ceiling frame supports comprises a central member of non-circular cross-section, preferably square, and a pair of end members in telescoping sliding engagement at opposite ends of the central member. The end members each have attachment devices at their free ends for securing them to respective spaced building members. A pipe holding bracket is slidably mounted on the central member and has a pair of arms projecting from the central member for engaging opposite faces of the fire sprinkler pipe between them. The arms can be urged towards one another to grip the fire sprinkler pipe to maintain it in a vertical or horizontal orientation and reduce the risk of displacement or misalignment of the fire sprinkler head during ceiling installation.

8 Claims, 6 Drawing Figures

FIRE SPRINKLER ALIGNMENT BRACKET

BACKGROUND OF THE INVENTION

The present invention relates to alignment brackets for holding and aligning pipes or other fixtures, and is particularly directed to a bracket for aligning a first sprinkler pipe.

Commercial, office and other buildings are now commonly required by law to have overhead fire sprinkler systems installed in the ceiling structure. Additionally, such systems are now often installed in homes. The first sprinkler system is normally installed during construction, and in the case of grid-type suspension ceilings the horizontal supply pipes are suspended from an overhead roof support structure with the vertical sprinkler heads projection gdownwardly between the grid of T-bar ceiling panel support members and through the ceiling panels. Since the fire sprinklers are installed prior to installation of the ceiling or ceiling panels, and the sprinkler pipes are relatively fragile, there is some risk that they will be pushed up or displaced at an angle when the ceiling panels are pushed into place.

Fixture supports are already known for mounting and supporting electrical fixtures in ceilings, but these are normally for actual mounting of an electrical fixture on ceiling joists or support members and are often not readily adjustable for different joist spacings. One such support is shown in U.S. Pat. No. 3,104,087 of Budnick and comprises two channel shaped telescoping elements which support a carrier for receiving an electrical fixture and have attachment devices at their free ends for securement to a pair of spaced apart building studs.

SUMMARY OF THE INVENTION

It is an object of the present invention to provide a bracket assembly for locating and aligning a fixture such as a fire sprinkler pipe or other plumbing pipe relative to a pair of spaced building studs or members such as joists, T-bar hangers for suspended ceilings, and the like.

According to the present invention a bracket assembly is provided which comprises a central, elongate member of non-circular cross-section, a pair of end sliding members telescopically engaged on respective opposite ends of the central member, and a bracket member slidably mounted on the central member, the bracket member having a pair of arms projecting to one side of the central member for engaging opposite faces of a pipe like member such as a fire sprinkler supply pipe. The arms can be urged towards one another to clamp or grip the pipe between them to locate it in a given orientation and prevent dislodging or misalignment of the pipe. The end members each have attachment devices at their free ends for securing them to building members such as ceiling joists or T-bar supports.

In the preferred arrangement the central member is a hollow tubular member of square cross-section and the end members are of a cross-section at least partially corresponding to that of the central member and project telescopically into opposite ends of the member. They are slidable relative to the central member until the correct length is reached to attach them to respective ones of a spaced pair of building members. Preferably, the central member is deformable to grip the end members against sliding movement when the correct extension is reached. For example, the central member may be of a relatively soft material such as aluminum and the end members may be harder, for example of steel. When the correct extension is reached, the central member is twisted or squeezed by pliers or a channel lock in the area of the end members so that its dimensions are reduced in that area and the end members bite into it to lock them against further sliding movement. The end members are suitably generally U-shaped channel members of square outline and of dimensions slightly smaller than those of the central member to allow them to slide telescopically relative to the central member during length adjustment.

The bracket member may, for example, comprise a generally U-shaped member having aligned square outline openings in its opposed limbs for sliding engagement over the square section central member. The free ends of the limbs project to one side of the central member, either upwardly or downwardly, or in a direction generally parallel to the building members to which the assembly is secured. In the latter orientation, the limbs can engage around a pipe such as a fire sprinkler supply pipe projecting vertically downwards in the space between the building members or joists. The free ends of the limbs can be urged towards one another and clamped to grip the pipe between them to locate the pipe in the desired orientation and reduce the risk of dislodgement of the pipe either upwardly or to one side out of the vertical orientation. Preferably, the bracket member is of deformable material and the limbs have aligned openings at their outermost free ends through which a bolt is passed and tightened to urge the limbs towards one another in the vicinity of the openings.

Although the assembly described above in the preferred embodiment has a generally square cross-section, other non-circular cross-sections may be used which prevent relative rotation between the telescoping members and between the central member and sliding bracket, so that the bracket is held in a specific orientation relative to the building members when the end members are attached to a pair of spaced building members.

BRIEF DESCRIPTION OF THE DRAWINGS

The present invention will be better understood from the following detailed description of a preferred embodiment, taken in conjunction with the accompanying drawings in which like reference numerals refer to like parts, and in which.

DESCRIPTION OF THE PREFERRED EMBODIMENT

Figure 1:
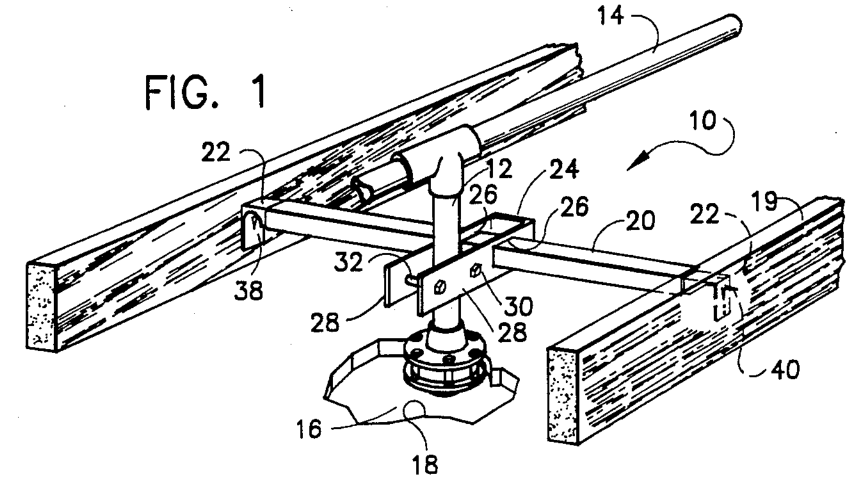
FIG. 1 is a perspective view of a fire sprinkler alignment bracket assembly according to a preferred embodiment of the invention shown secured to a pair of wood studs or joists and holding a first sprinkler supply pipe.

The drawings show an alignment bracket assembly 10 according to a preferred embodiment of the present invention which is particularly designed for holding and aligning a fire sprinkler supply pipe 12 of the type which normally projects vertically downwardly from an overhead water supply 14 and has a fire sprinkler device or head 16 at its free end which projects through the installed ceiling 18 as indicated in FIG. 1. Although the bracket assembly described and shown in the drawings is particularly intended for alignment of fire sprinklers installed in ceiling structures relative to ceiling support members such as joists 19 as shown in FIG. 1, it will be understood that it may alternatively be used for alignment of other plumbing pipes or fixtures within buildings either horizontally or vertically relative to any spaced building members.

Figure 4:
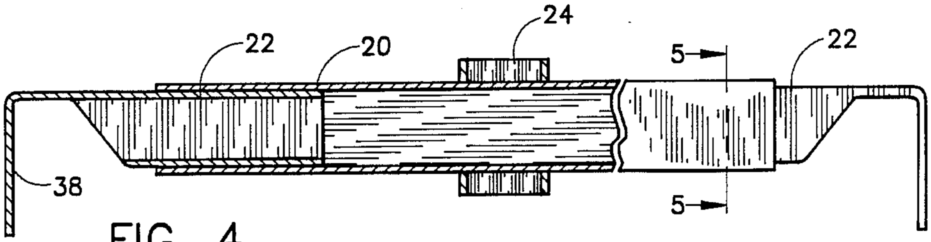
FIG. 4 is a cross-section on the lines 4—4 of FIG. 1.
Figure 5:
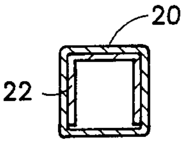
FIG. 5 is a cross-section on the lines 5—5 of FIG. 4.

As best shown in FIGS. 1, 4 and 5, the bracket assembly 10 comprises a central elongate member 20 which is preferably of square cross-section and tubular construction, and a pair of elongate end or slide members 22 which are slidably and telescopically engaged in opposite ends of the tubular member. The end members are preferably of channel configuration as shown in FIGS. 4 and 5, and are of part square cross-section generally corresponding to that of the central member so that they are a close sliding fit in that member.

Figure 6:
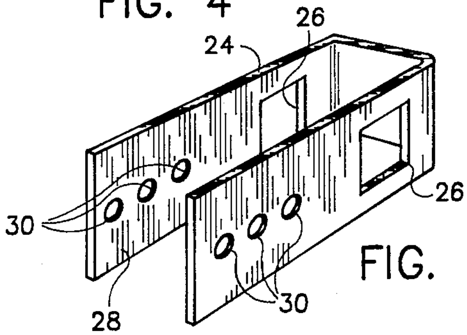
FIG. 6 is a perspective view of the pipe holder of the assembly.

Slidably mounted on the central member is a pipe holder device or bracket member 24 for engaging and gripping a fire sprinkler pipe 12. As best shown in FIG. 6, the bracket member is preferably a generally U-shaped bracket having a pair of aligned openings 26 in the opposed limbs 28 adjacent the closed end of the bracket. The openings are of square outline and dimensions corresponding to the outer dimensions of the central member to allow the member to fit slidably over the central member as shown in FIG. 1 with the free ends of the opposed limbs projecting transversely to one side and outwardly from the member 20. The limbs 28 have sets of spaced aligned openings 30 adjacent their free ends and are deformable by means of a screw or bolt 32 engaging through a respective pair of aligned openings to urge the ends towards one another as indicated in FIG. 1. Preferably, the openings or holes 30 in one of the limbs 28 are larger than the holes in the opposing limb. In the arrangement shown in FIG. 1, the pipe holder is mounted on the central member so that the limbs 28 project to one side on the central member to engage a pipe projecting vertically downwards. However, it could alternatively be arranged so that the limbs project upwardly or downwardly to engage a horizontal pipe.

Figure 3:
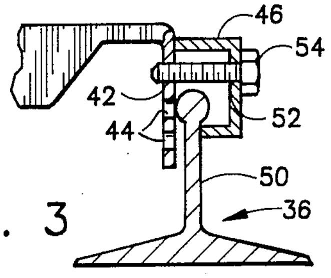
FIG. 3 is a cross-section similar to FIG. 2 showing an alternative arrangement for securing the assembly to a metal T-bar of the type used in suspended panel ceilings.
Figure 2:
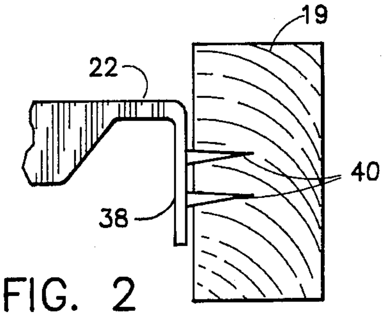
FIG. 2 is a partial horizontal cross-section on the lines 2—2 of FIG. 1 showing the attachment device at one end of the assembly for securing it to a wooden stud or joist.

Each of the end members has an attachment device at its free end for securing it to a building member such as the wooden joist or stud 19 as shown in FIGS. 1 and 2, or to a metal T-bar 36 of the type used in support frames for suspended panel ceilings, as shown in FIG. 3. In the arrangement shown in FIG. 1 and 2 the attachment device is self-nailing and comprises an end plate or flange 38 at the free end of each channel member which is bent downwardly at substantially 90 degrees to the channel member axis, and one or more barbs 40 projecting outwardly from the end plate 38 which can be hammered or otherwise urged into a wooden building stud or joist to attach the assembly to the joist as shown in FIGS. 1 and 2.

In the alternative arrangement shown in FIG. 3 the end channels each have a similar end plate or flange 42 projecting downwardly but instead of projecting barbs as shown in FIG. 1, the flanges 42 have spaced openings 44 and clip members 46 having inturned edges 48 are provided for releasably clamping the vertical member 50 of metal T-bar 36 of the type used in suspended frame ceilings between the clip member 46 and opposed flange 42. The clip member 46 has one or more openings 52 which are preferably larger than the openings in the end flange 42. Once the bracket assembly has been adjusted to the correct height, a clamping screw 54 is inserted through opening 52 and an aligned one of the openings 44 in the end flange 42 and tightened to grip the member 50 between the inturned lower edge 48 of clip member 46 and the opposed outer face of end flange 42, as shown in FIG. 3. In alternative arrangements the end channel flanges may be provided with both self-nailing barbs and openings for clamping them to spaced clip members, so that the same bracket assembly can be secured to either metal T-bars or wooden joists or studs in different types of ceilings.

In order to locate a suspended horizontal or vertical pipe relative to spaced building members such as joists, T-bars and the like, the pipe holder or bracket 24 is first slid over the square section central member 20 with the limbs projecting either to one side as shown in FIG. 1 for locating a vertical pipe, or upwardly or downwardly for locating a horizontal pipe. The two end channels or members 22 are then pushed into the opposite ends of the central member.

The outer ends of each of the end members are then secured to a pair of adjacent building members between which the pipe is to be located. The end members are pulled out or pushed into the central member until the correct extension is reached. If the assembly is secure between wooden joists 19 as shown in FIG. 1, the barbs at each end of the assembly are suitably forced into the joists. Where the assembly is to be secured between metal T-bars as shown in FIG. 3, the opposite end clip members 46 are first loosely secured to the respective end brackets 42 by means of screws. Preferably, three attachment holes are provided in each end flange to allow for different T-bar sizes. The clip and end flange at each end of the assembly are then clamped around the respective T-bar as shown in FIG. 3.

The opposite arms or limbs 28 of the pipe holder 24 are engaged around the already installed horizontal or vertical pipe either before or after the end flanges are secured to the respective spaced building members. The screw is then inserted into one of the larger holes of one limb of the pipe holder and tightened through the opposed smaller hole in the other limb by means of a nut driver, torque wrench or screw driver. In the preferred arrangement three spaced holes are provided in each limb for various pipe sizes. The pipe holder limbs are suitably relatively deformable so that tightening the screw will draw the two limbs together and clamp them around the enclosed pipe to hold the pipe in the opening defined between the opposed faces of the limbs and the adjacent enclosed face of the central member. The pipe may first be enclosed or wrapped in insulation tape at the region clamped between the limbs which both insulates the pipe from the metal attachment and helps to prevent slippings.

In the preferred arrangement the central member is of a relatively soft, deformable metal such as aluminum while the end members are of a harder metal such as steel. Once the correct extension of the assembly has been reached the end members can be locked in the central member by simply squeezing or twisting the central member in the vicinity of the telescoping inner portion of each end member to deform the central member and cause the harder steel end members to bite into it and lock in place. This may be done with pliers or a channel lock, for example.

Preferably, the holder or bracket is dimensioned to hold pipes of diameter from ¾ inches to 1.25 inches and the bracket assembly can be expanded to span up to 24 inches in length. In one arrangement the assembly could be adjusted in length in the range from 20 inches to 24 inches. Clearly, however, any desired length adjustment could be provided by suitable choice of the length of the central member and end members, according to the range of spacings between building members found in typical building construction. A smaller version expandable from around 12 inches to 18 inches may also be provided, for example.

The assembly shown in FIG. 3 which attaches to metal T-bars is designed to attach to metal T-bars of all sizes by means of the clip and bolt arrangement shown. Because the assembly is attached at both ends to building members such as T-bars, joists and the like there will be no vertical or horizontal movement of the assembly and thus the held pipe will be restrained against vertical or horizontal movement. Relative rotation between the various sliding parts of the assembly is prevented by the non-circular cross sections of these parts and thus sideways movement of the attached pipe out of the desired vertical or horizontal orientation is prevented. In the arrangement shown in FIG. 1, the second vertical pipe is restricted against pushing upwards or to an angle out of the desired vertical orientation by the secured bracket assembly.

In one preferred example the central member of the assembly was made of ½ inch aluminum square tube and the end members were each of 18 gauge galvanized steel. The pipe holder or bracket may also be of 18 gauge galvanized steel and the limbs are preferably dimensioned to project approximately 2.5 inches out from the central member. Clearly the limbs may project a smaller or greater distance out from the central member on which the bracket is held in alternative arrangements for holding different size pipes.

The assembly described above is particularly intended for locating and aligning fire sprinkler pipes either horizontally or vertically to reduce the risk of the fire sprinkler fixtures being either pushed up or to one side during ceiling or ceiling panel installation. The fire sprinkler assembly will be supported from a separate overhead support structure (not shown) but this is not normally sufficient to prevent the sprinkler pipes from being pushed aside or upwards. Thus the bracket assembly shown in the drawings can be installed at appropriate points between spaced pairs of ceiling members or joists so that the bracket or pipe holder can be secured to a vertical or horizontal pipe of the sprinkler assembly to restrict movement of the pipe. In the preferred arrangement shown in FIG. 1 the bracket is secured around the vertical supply pipe section which has the fire sprinkler device attached at its free lower end, although the assembly could alternatively be secured to the horizontal pipe section. The assembly can be secured either to metal or plastic pipes of the type commonly used in plumbing installations.

Although in the preferred arrangement the bracket assembly is used for aligning fire sprinkler pipes, it may be used to align any plumbing pipes running between pairs of spaced apart building studs in an equivalent manner.

Although a preferred embodiment of the invention has been described above by way of example, it will be understood by those skilled in the field that modifications may be made to the disclosed embodiment without departing from the scope of the invention, which is defined by the appended claims.

I claim:

1. An alignment bracket for holding and aligning a pipe relative to a pair of building support members, comprising:

a central elongate tubular member of square cross-section;

a pipe holder slidably mounted on the central member comprising a U-shaped bracket having opposed straight arms and clamping means for urging the arms towards one another and securing their free ends together for releasably clamping the arms around a pipe extending transversely through the arms, the bracket having aligned square openings in its arms adjacent the closed end of the U-shape for slidably engaging over the central member, each arm having a plurality of spaced openings at different distances from its free end which are aligned with corresponding openings in the other arm, and the clamping means comprising screw means for engaging through a selected pair of aligned openings adjacent the free ends of the arms to draw the arms towards one another, the spaced openings allowing the bracket to be clamped around different diameter pipes; and a pair of elongate, channel section slide members telescopically engaged in respective opposite ends of the central member, the slide members being of part square cross section corresponding to that of the central member so that they are a close sliding fit in opposite ends of that member, each slide member having attachment means at its outer free end for securing it to a respective one of a pair of spaced building members;

the central member being of a deformable metal and the slide members being of a harder metal, the central member being deformable relative to the slide members to grip against opposing surfaces of the slide members to prevent relative sliding movement when the assembly has been adjusted to the desired length.

2. The assembly as claimed in claim 1, wherein the central member is of aluminum and the slide members are of steel.

3. The assembly as claimed in claim 1, wherein each opening in one arm of the bracket is larger than those in the outer arm.

4. The assembly as claimed in claim 1, wherein the attachment means on each slide member comprises means for attaching the slide member to a wooden stud.

5. The assembly as claimed in claim 4, wherein the attachment means comprises at least one barb projecting outwardly from the free end of each slide member for embedding in a wooden building member.

6. The assembly as claimed in claim 1, wherein the attachment means comprises clamp means for clamping the respective slide member to a respective metal T-bar.

7. The assembly as claimed in claim 6, wherein each slide member has an end flange at its outer end for engaging flat against the vertical member of a T-bar, and the clamp means comprises a clip member having an inturned end for engaging the opposite face of the vertical member to the end flange and securing means for securing the clip member to the end flange to clamp the vertical member between the clip member and end flange.

8. The assembly as claimed in claim 7, wherein the end flange has a series of spaced openings and the clip member has at least one opening, the securing means comprises bolt means for extending through the opening in the clip member and an aligned opening in the end flange to secure the clip member to the end flange.

* * * * *